US011383839B2

(12) United States Patent
Burd

(10) Patent No.: US 11,383,839 B2
(45) Date of Patent: Jul. 12, 2022

(54) RECONFIGURABLE NARROW GALLEY CART FOR SINGLE-AISLE AIRCRAFT

(71) Applicant: B/E Aerospace, Inc., Winston-Salem, NC (US)

(72) Inventor: Peter J. L. Burd, Burry Port (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 296 days.

(21) Appl. No.: 16/692,630

(22) Filed: Nov. 22, 2019

(65) Prior Publication Data

US 2021/0155347 A1 May 27, 2021

(51) Int. Cl.
 *B64D 11/00* (2006.01)
 *B62B 3/00* (2006.01)
 *B62B 3/02* (2006.01)

(52) U.S. Cl.
 CPC .......... *B64D 11/0007* (2013.01); *B62B 3/002* (2013.01); *B62B 3/02* (2013.01)

(58) Field of Classification Search
 CPC ........ B62B 3/02; B62B 3/002; B64D 11/0007
 USPC ................ 264/257; 280/651; 296/187.01
 See application file for complete search history.

(56) References Cited

U.S. PATENT DOCUMENTS

| 5,497,856 | A | * | 3/1996 | Block | B60B 33/0081 |
| | | | | | 188/1.12 |
| 7,544,915 | B2 | * | 6/2009 | Hu | B62B 3/006 |
| | | | | | 219/387 |
| 8,042,819 | B2 | | 10/2011 | Arnold et al. | |
| 8,523,197 | B2 | | 9/2013 | Baatz et al. | |
| 8,936,260 | B2 | | 1/2015 | Burd | |
| 9,180,897 | B2 | * | 11/2015 | Boivin | B62B 3/004 |
| 9,193,462 | B2 | | 11/2015 | Burd | |
| 10,137,987 | B2 | | 11/2018 | Burd | |
| 10,518,578 | B1 | * | 12/2019 | Spektor | B60B 33/045 |
| 2002/0093273 | A1 | * | 7/2002 | Itakura | A47B 31/00 |
| | | | | | 312/205 |
| 2005/0218615 | A1 | * | 10/2005 | Hu | B62B 3/006 |
| | | | | | 280/47.35 |
| 2011/0248458 | A1 | * | 10/2011 | Belanger | B29C 65/562 |
| | | | | | 280/47.35 |

(Continued)

FOREIGN PATENT DOCUMENTS

| CN | 107878525 A | 4/2018 |
| CN | 108116469 A | 6/2018 |

*Primary Examiner* — James A Shriver, II
*Assistant Examiner* — Hilary L Johns
(74) *Attorney, Agent, or Firm* — Suiter Swantz pc llo

(57) ABSTRACT

An aircraft galley cart is disclosed. In embodiments, the galley cart includes two adjacent portions (e.g., left and right side) hingedly or slidably connected. The galley cart has a default configuration compatible with galley cart bays of galley structures. The galley cart may be transitioned into a narrow configuration by articulating the left-side portion relative to the right-side portion (e.g., by pivoting or rotating the left-side portion). When in the narrow configuration, the galley cart may be twice as long but half as wide, allowing passenger access through an aisle without removing the galley cart back out of the aisle and disrupting in-seat food and beverage services. The galley cart includes auxiliary casters that deploy during transition to support the main casters in keeping the galley cart balanced and mobile in the narrow configuration.

13 Claims, 8 Drawing Sheets

(56) References Cited

U.S. PATENT DOCUMENTS

2011/0278879 A1* 11/2011 Belanger ................ B29C 70/86
                                                      296/187.01
2017/0282950 A1    10/2017 Patwardhan

* cited by examiner

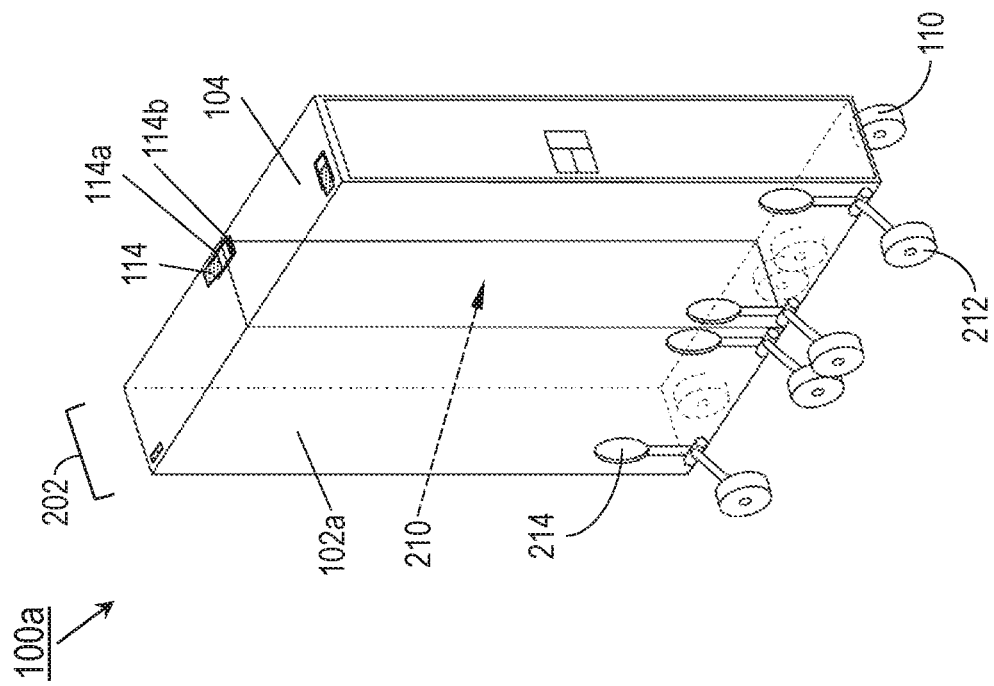
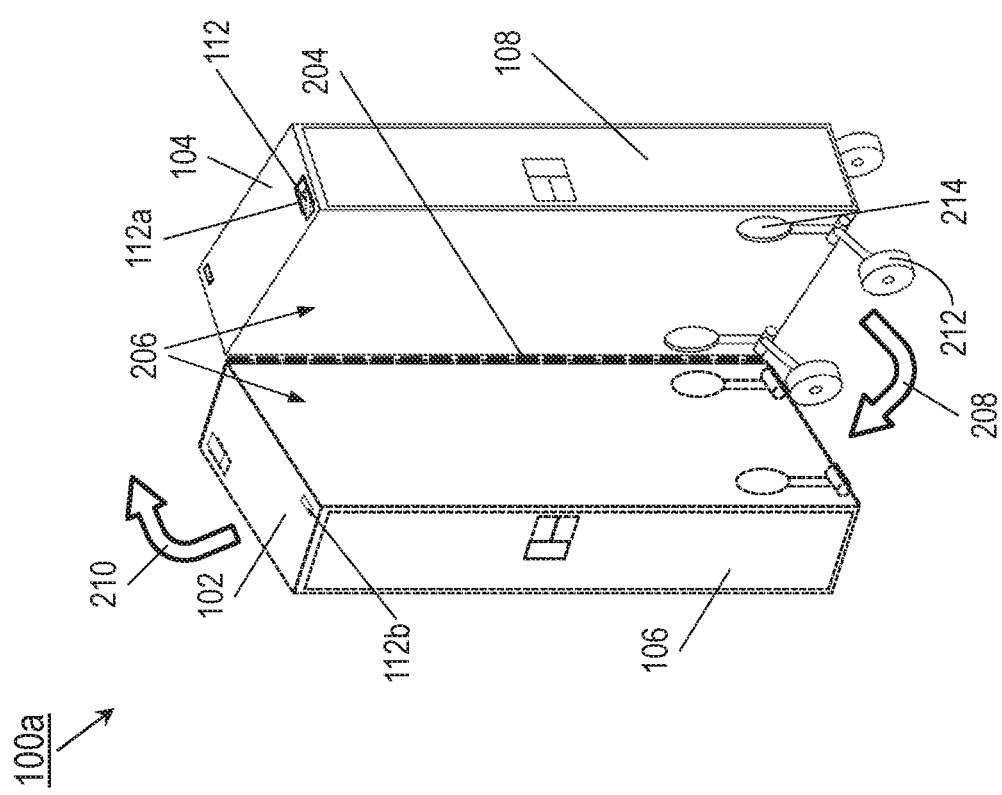

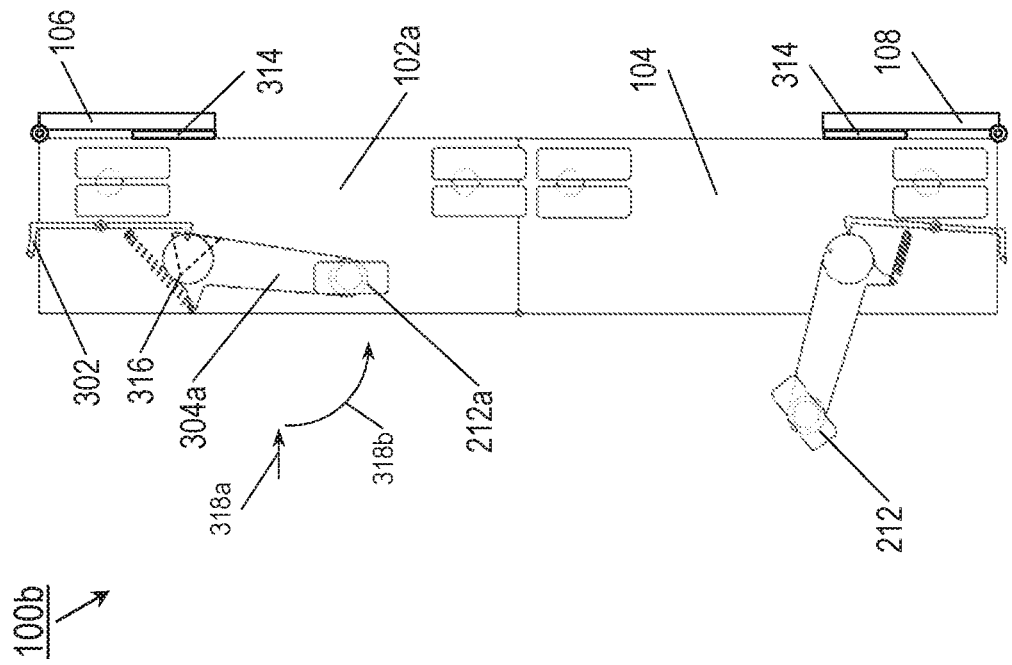
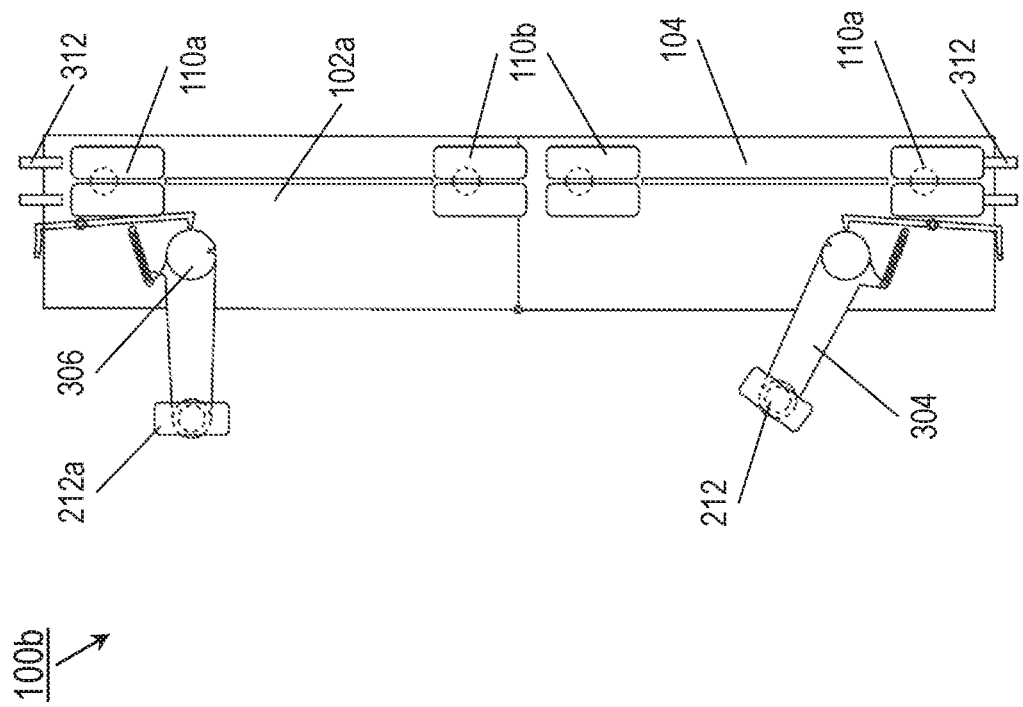
FIG. 3D
FIG. 3C

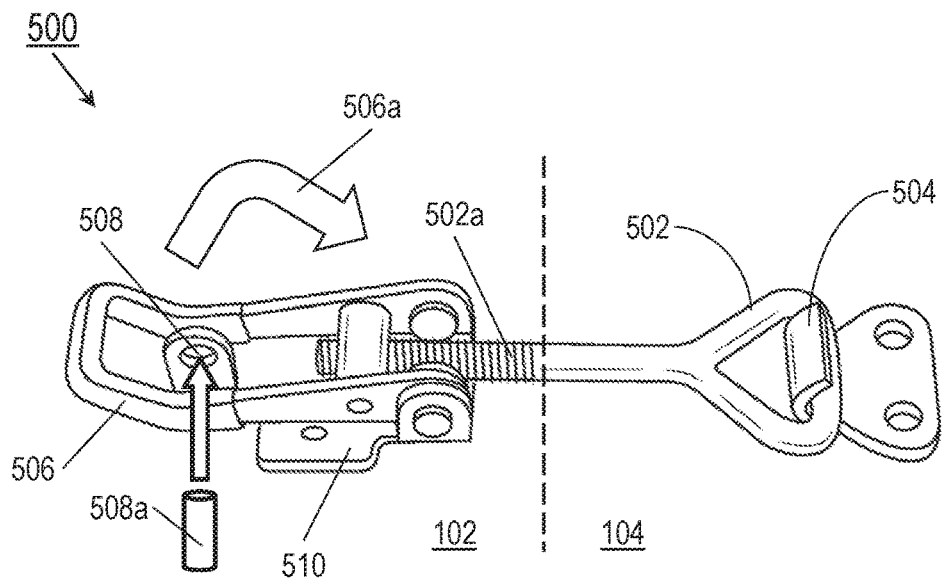
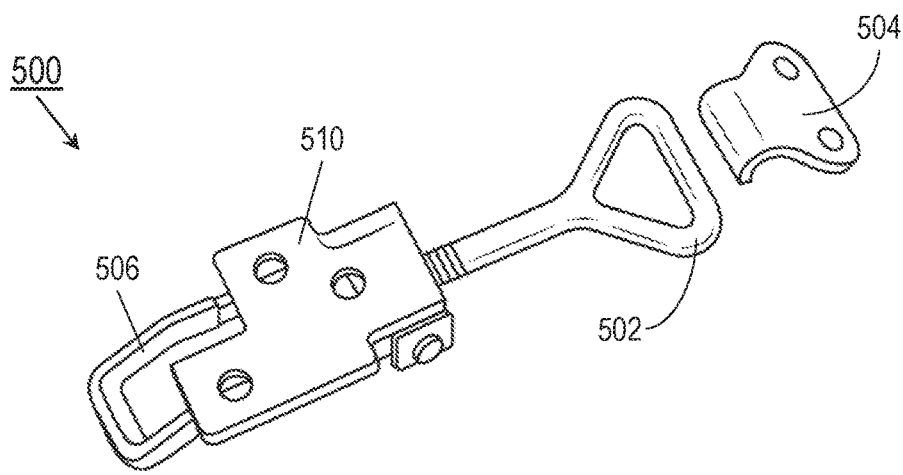
FIG. 5A
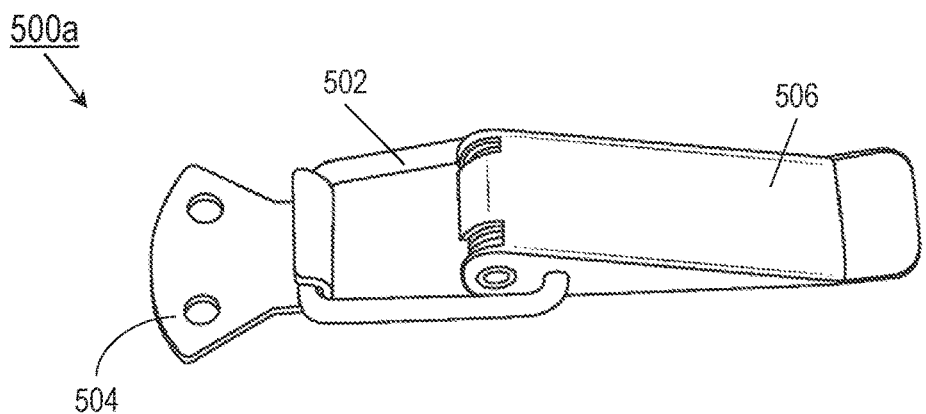
FIG. 5B

RECONFIGURABLE NARROW GALLEY CART FOR SINGLE-AISLE AIRCRAFT

TECHNICAL FIELD

Embodiments of the subject matter disclosed herein are directed generally to aircraft interiors and more particularly to a mobile galley cart.

BACKGROUND

When inflight in-seat food and beverage services are underway aboard narrow-body or single-aisle aircraft, mobile galley carts (e.g., trolleys) are removed from their stowage locations and transported along the central aisle of the passenger cabin. Once services have commenced, the galley cart is an unavoidable obstruction in the aisle. Should a passenger need to traverse the aisle for any reason (e.g., for the use of lavatory facilities), it is impossible for them move past the galley cart without disrupting services to their fellow passengers.

SUMMARY

An aircraft galley cart is disclosed. In embodiments, the aircraft galley cart includes a left-side and a right-side portion hingedly coupled together, each portion accessible via its own door. The galley cart has a default configuration capable of stowage within a full-size cart bay (e.g., the left-side and right-side portions together are of a standard full-size width). The galley cart can be deployed into a narrow configuration whereby the width of the cart as a whole is substantially half that of its full-size/default-configuration width. The left-side portion of the cart is rotated around a vertical axis to transition the cart between the default configuration and the deployed configuration. The galley cart includes main casters rotatable relative to the aircraft floor, via which the galley cart is transportable around the aircraft cabin. The galley cart includes additional auxiliary casters capable of stabilizing the cart when in the deployed configuration (e.g., in addition to the main casters).

An aircraft galley cart is disclosed. In embodiments, the aircraft galley cart includes left-side and right-side portions slidably connected to each other, each of the left-side and right-side portions accessible via its own door. The galley cart has a default configuration capable of stowage within a full-size cart bay (e.g., the left-side and right-side portions together are of a standard full-size width). The galley cart can be deployed into a narrow configuration whereby the width of the cart as a whole is substantially half that of its full-size/default-configuration width. For example, the left-side portion may be slid laterally relative to the right-side portion to transition the galley cart into a narrow configuration wherein the left-side portion is oriented directly behind the right-side portion, the resulting deployed galley cart being half as wide as in the default configuration. The galley cart includes main casters rotatable relative to the aircraft floor, via which the galley cart is transportable around the aircraft cabin. The galley cart includes additional auxiliary casters capable of stabilizing the cart when in the deployed configuration (e.g., in addition to the main casters).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2A is an isometric view illustrating the aircraft galley cart of FIG. 1 hingedly transitioning between the default configuration and a deployed configuration;

FIG. 2B is an isometric view illustrating the aircraft galley cart of FIG. 2A fully transitioned to the deployed configuration;

FIGS. 3C and 3D are underside views of the aircraft galley cart of FIG. 3B in the fully deployed configuration;

and FIGS. 5A and 5B are illustrations of locking devices for the aircraft galley cart of FIG. 1.

DETAILED DESCRIPTION

Figure 1:
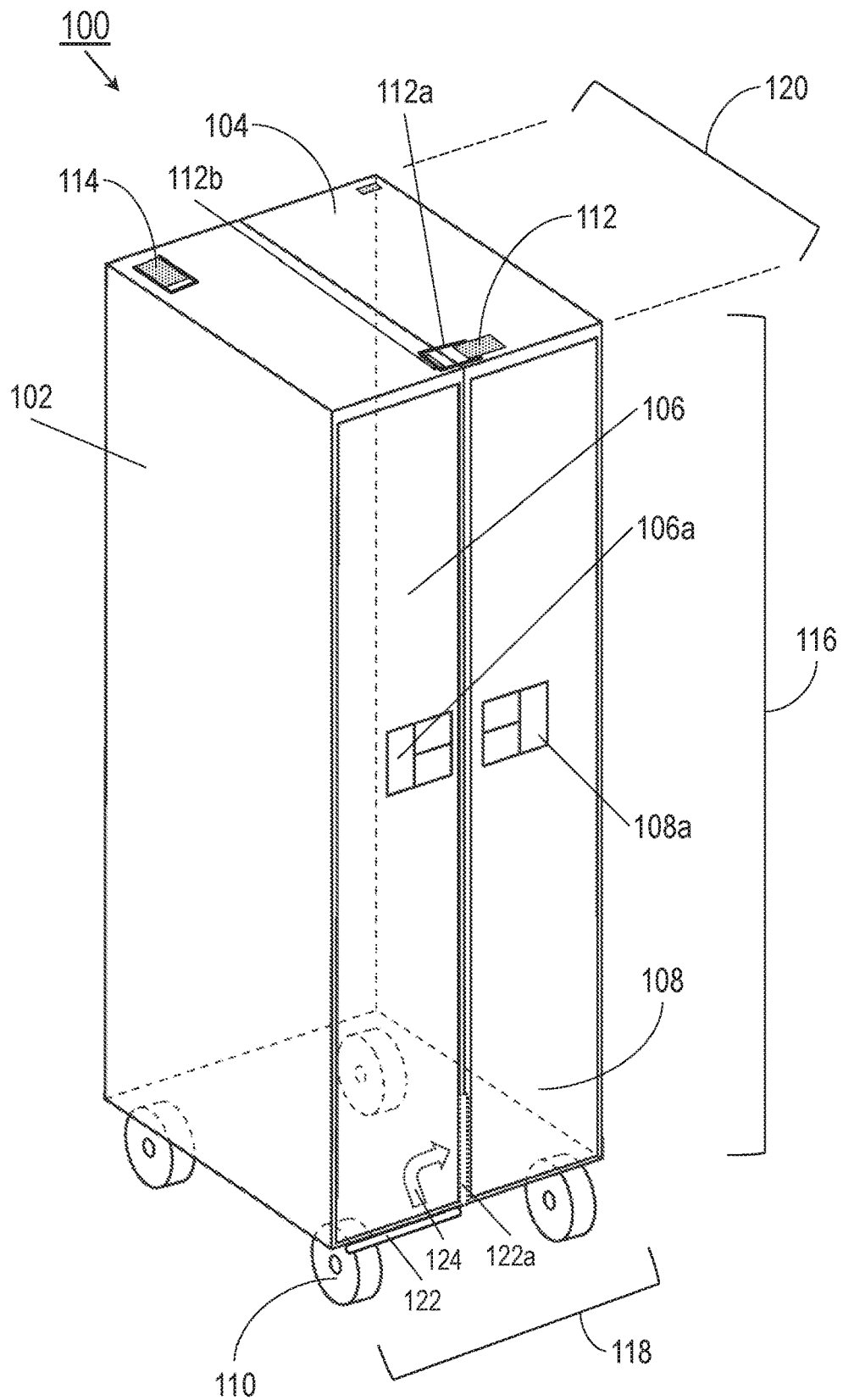
FIG. 1 is an isometric view illustrating an aircraft galley cart in a default configuration in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a galley cart 100 is disclosed. The galley cart 100 may include left-side and right-side compartments 102, 104 accessible via opposing doors 106, 108 having handles 106a, 108a; main casters 110 attached to its underside; and locking devices 112, 114.

In embodiments, the galley cart 100 (e.g., trolley) may be proportioned as a half-size galley cart having a default configuration (as shown by FIG. 1). For example, when in the default configuration, the galley cart 100 may have a height 116 and a width 118 consistent with a standard-size galley cart stowable in an existing cart bay of an aircraft galley or galley structure, and a depth 120 half that of a standard-size galley cart (e.g., such that the galley cart 100 may be capable of dual stowage, i.e., two galley carts may be stowable in a standard full-size cart bay, one cart in front of the other). The left-side and right-side compartments 102, 104 may each be configured for storage of foods and beverages, e.g., on internal shelves or within internal drawers or compartments accessible through the doors 106, 108.

In embodiments, the galley cart 100 may be suitable for use by cabin crew for in-seat food and beverage services. For example, the galley cart 100 may be removed from stowage (e.g., within a cart bay) and propelled along an aircraft aisle by crewmembers via the main casters 110 on the underside. In some embodiments, the main casters 110 may be rotatably attached to the underside of the galley cart such that the galley cart 100 may traverse along the floor of the aircraft passenger cabin. For example, the main casters 110 may be fully rotatable through 360 degrees relative to the galley cart 100, which may therefore require minimal surface area to pivot into a new orientation. The default width 118 of the galley cart 100 may allow the galley cart to travel in a substantially longitudinal direction along an aisle of standard size aboard a narrowbody aircraft, e.g., substantially parallel to the longitudinal or roll axis of the aircraft. However, the width of the aisle may allow for only minimal free space (e.g., no more than a few inches) on either side of the galley cart 100 while food or beverage services are underway. If, for example, the galley cart 100 is proceeding forward along the aircraft aisle (e.g., from an aft galley structure toward the front of the aircraft, or the front of a section thereof, substantially parallel with the direction of travel) and a passenger forward of the current position of the galley cart wishes to access an aft lavatory area (e.g., aft of the current galley cart position), then either the passenger must wait for the galley cart to pass forward of their seat or the galley cart must be returned down the aisle to a position where the cart may no longer obstruct the aisle.

In embodiments, the locking devices 112 may be engaged to secure the galley cart 100 in the default configuration shown by FIG. 1. For example, the locking device 112 may include a lockable adjustable or fixed-detent hook 112a mounted to the right-side compartment 104 (e.g., on the top face of the right-side compartment). The hook 112a may securely engage with a catch 112b mounted to the left-side compartment 102 (e.g., mounted to the top face of the left-side compartment opposite the hook 112a) to secure the left-side and right-side compartments together. Transitioning of the galley cart 100 from the default configuration to the deployed configuration may begin with unlocking the hook 112a from the catch 112b, such that the left-side compartment 102 may be deployed relative to the right-side compartment 104. In some embodiments, the locking devices 112, 114 may be partially or fully recessed into the surface of the left-side and right-side compartments 102, 104, e.g., for safety or spacing considerations.

In some embodiments, the galley cart 100 may include hand-operable or foot-operable levers 122 capable of deploying additional auxiliary casters to stabilize the galley cart when in a partially or fully deployed configuration, as described in more detail below by FIGS. 2A and 2B. For example, the lever 122 may be rotated (124) from a stowed position into a deployed position 122a (e.g., and back again to re-stow the auxiliary casters when returning the galley cart 100 to the default configuration).

Referring now to FIGS. 2A and 2B, the galley cart 100a may be implemented and may function similarly to the galley cart 100 of FIG. 1, except that the galley cart 100a may pivotably transition from the default configuration shown by FIG. 1 to a deployed configuration (shown particularly by FIG. 2B). When in the deployed configuration, the width 202 of the galley cart 100a may be approximately halved; for example, a galley cart so configured may allow a passenger traversing an aisle within the passenger cabin additional room to bypass the galley cart without removing the galley cart from the aisle or otherwise disrupting food and beverage services to other passengers.

In embodiments, the left-side and right-side compartments 102, 104 of the galley cart 100a may be coupled by continuous hinges 204. For example, before traversing the galley cart 100a along the aircraft aisle, cabin crew may detach the locking devices 112 securing the left-side and right-side compartments 102, 104 (which may share a common lateral surface 206) in the default configuration (e.g., unfastening the hook 112a from the catch 112b). The left-side compartment 102 may then be rotated substantially 180 degrees (208) into a rear-facing orientation (102a) such that the left-side and right-side compartments 102, 104 share a common rear surface (210) and are accessible from opposite sides of the galley cart 100a.

In embodiments, the left-side and right-side compartments 102, 104 may include auxiliary casters 212 stowed within their respective common lateral surfaces 206. For example, the auxiliary casters 212 may be stowed in recesses 214 within the common lateral surfaces 206, deploying when the left-side compartment 102 rotates into the deployed configuration (see, e.g., FIGS. 3A-E below) such that the galley cart 100a is adequately balanced and able to traverse the aircraft aisle when in the narrow configuration.

In some embodiments, the exterior walls of the galley cart 100*a* may be thicker to accommodate the recesses 214 without encroaching on meal tray storage space in the interior of the galley cart.

In some embodiments, the locking device 114 may secure the left-side and right-side compartments 102, 104 of the galley cart 100*a* in the deployed configuration (particularly shown by FIG. 2B), e.g., by engaging the hook 114*a* with the catch 114*b*. In some embodiments, the thickness of the outer walls of the left-side and right-side compartments 102, 104, the volume of the interior compartments therewithin, and the sizes of any shelves or trays removably or permanently disposed within the interior compartments, may vary to accommodate the auxiliary casters 212, the recesses 214, or any associated hardware.

Figure 3A:
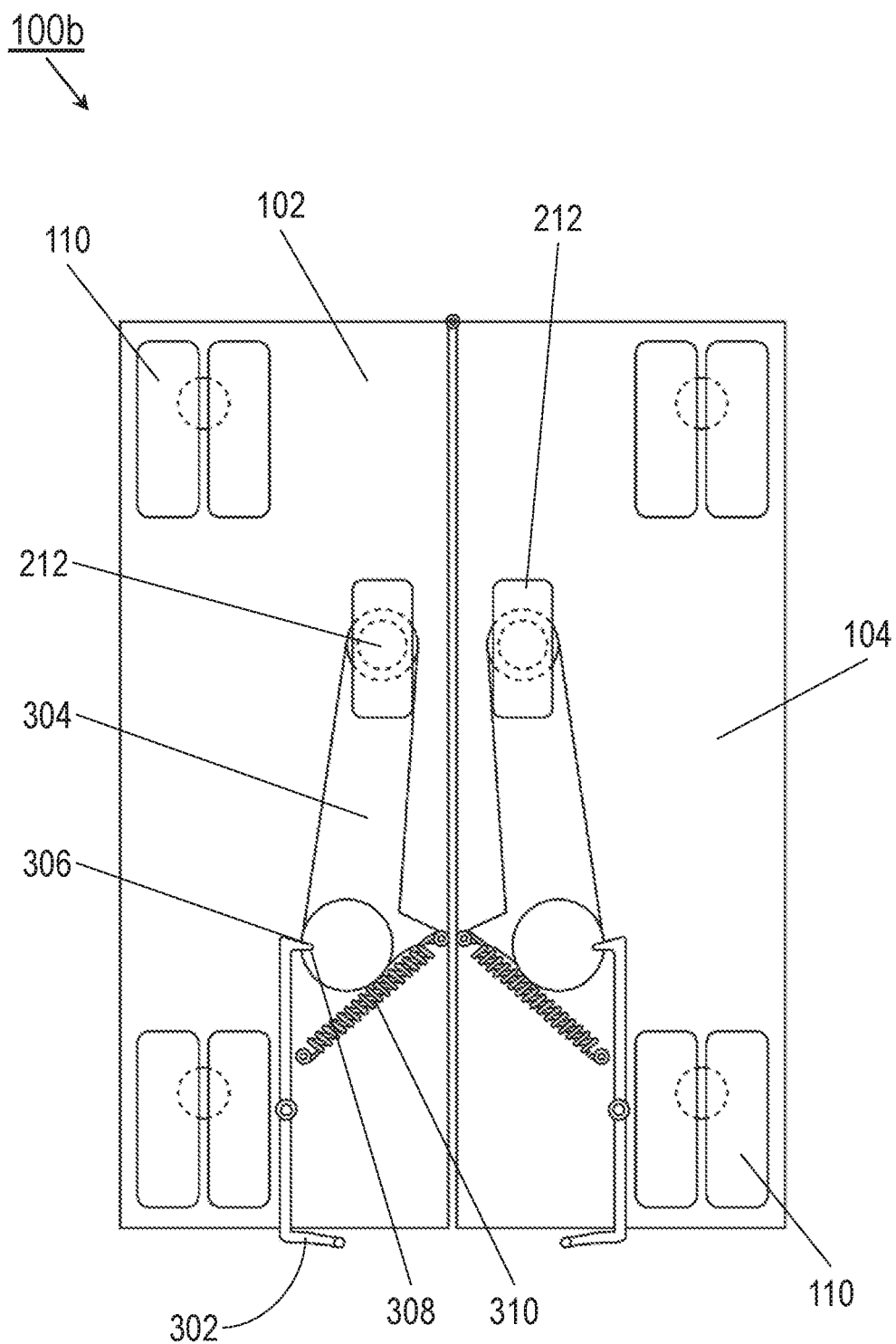
FIG. 3A is an underside view of the aircraft galley cart of FIG. 1 in the default configuration.
Figure 3B:
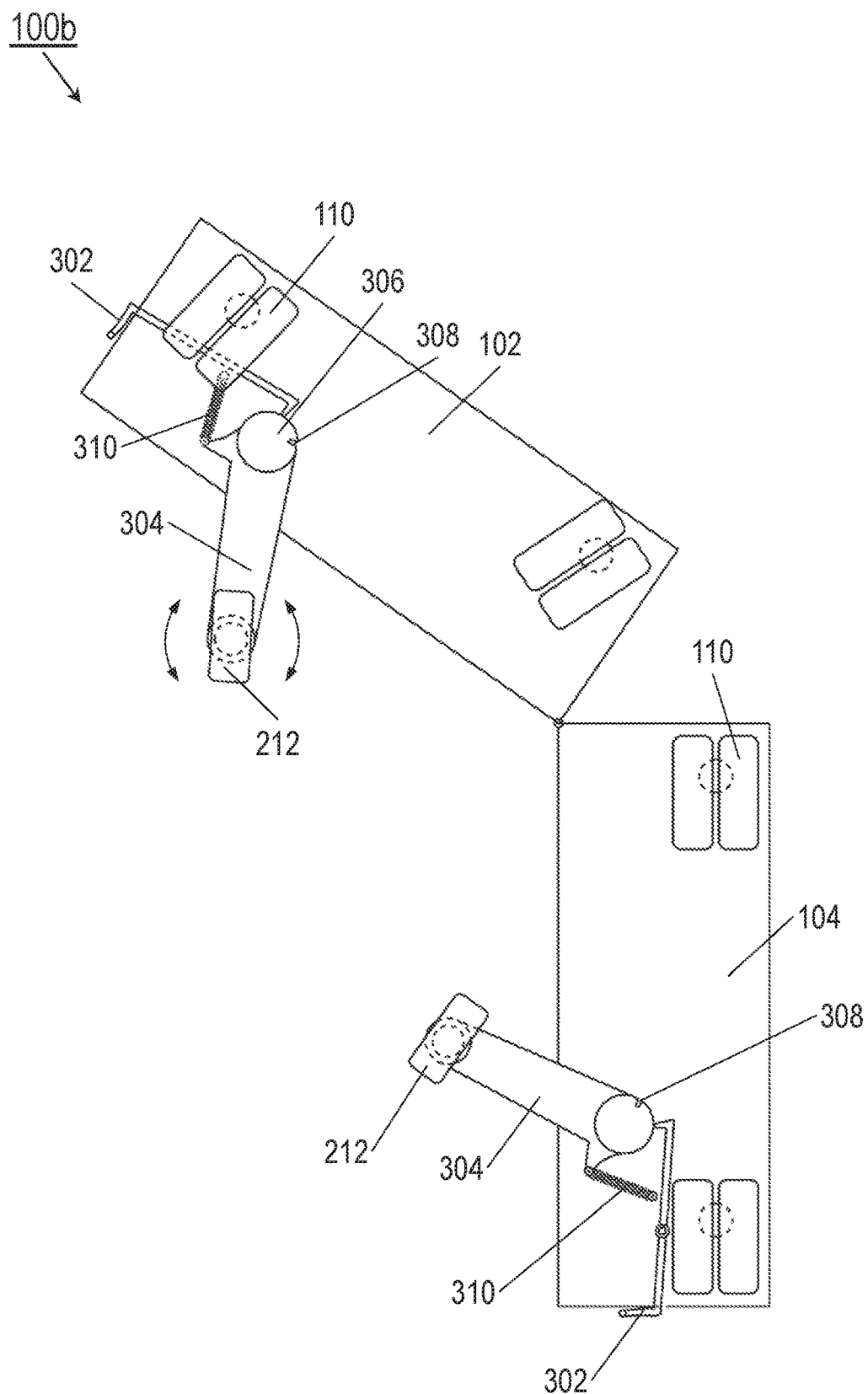
FIG. 3B is an underside view of the aircraft galley cart of FIG. 3A in a partially deployed configuration between the default and deployed configurations.
Figure 3E:
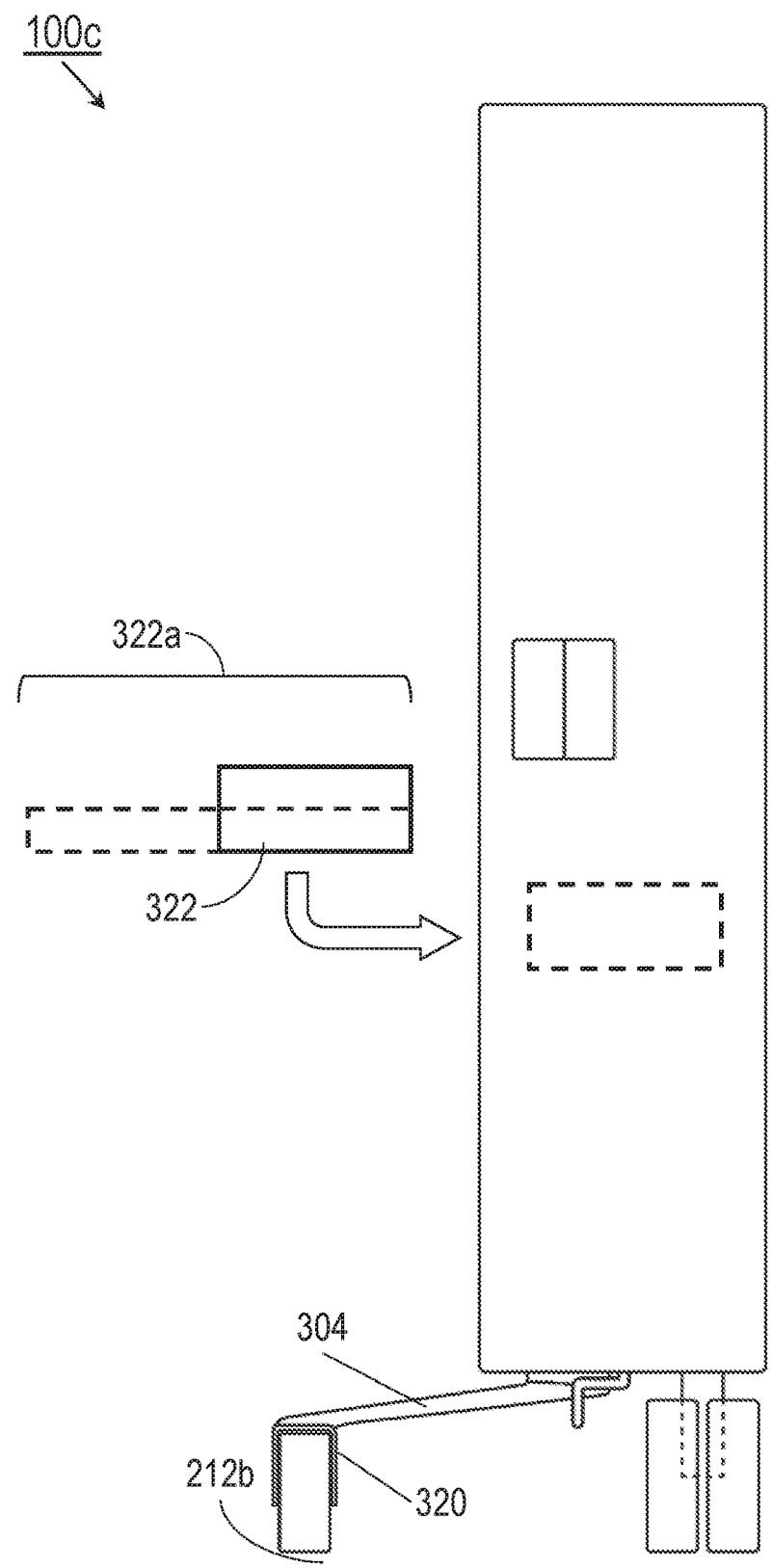
FIG. 3E is a forward view of the aircraft galley cart of FIGS. 3A through 3D in the fully deployed configuration.

Referring now to FIGS. 3A through 3E, the galley cart 100*b* may respectively be implemented and may function similarly to the galley cart 100*a*, except that the galley cart 100*b* may include auxiliary caster releases 302 capable of deploying the auxiliary casters 212 from a stowed position (e.g., when the galley cart 100*a* is in the default configuration shown by FIG. 3A) to a deployed position (e.g., when the galley cart is in a partially deployed configuration shown by FIG. 3B or a fully deployed configuration as shown by FIGS. 3C-E). It should be noted that when the galley cart 100*b* is in the fully deployed position, the main casters 110 may be located on a single side of the galley cart 100*b*. Accordingly, the auxiliary casters 212 may deploy to stabilize the galley cart 100*b* when partially or fully deployed, allowing the galley cart to remain upright and balanced or to traverse the floor of the aircraft cabin.

In embodiments, the auxiliary casters 212 may be partially or fully concealed within the underside of the left-side compartments 102, 102*a* and right-side compartments 104 and deployable (e.g., automatically, or manually via the auxiliary caster releases 302) when the galley cart 100*b* transitions from the default configuration to the fully deployed configuration. For example, the auxiliary casters 212 may be rotatably mounted to support arms 304, the support arms pivotably mounted to the underside of the left-side compartments 102, 102*a* and right-side compartments 104 via pivot points 306. In some embodiments, the auxiliary casters 212 may (similarly to the main casters 110) be capable of a full 360 degrees of rotation relative to the support arms 304.

In embodiments, the auxiliary caster releases 302 may be configured for hands-free operation. For example, the auxiliary caster releases 302 may include foot-operated spring-loaded release pawls capable of securing the support arms 304 and auxiliary casters 212 in a stowed position, e.g., via catches 308 in the pivot points 306. Referring also to FIG. 4, the auxiliary caster releases 302 may be deployed by a foot of the user, releasing the support arms 304 and auxiliary casters 212 to deploy toward the aircraft floor (e.g., outward/downward) assisted by tension springs 310.

Referring in particular to FIG. 3C, the auxiliary caster releases 302 may lock the auxiliary casters 212 into their fully deployed positions (212*a*) via the pivot points 306 when the galley cart 100*b* reaches the fully deployed configuration. In some embodiments, the main casters 110 may include forward casters 110*a* and rear casters 110*b*. For example, the forward casters 110*a* may include foot brakes 312 operable on each forward caster; when the galley cart 100*b* is in the fully deployed configuration the foot brakes 312 may be operable on both ends to hold the forward casters in position and prevent movement of the galley cart. Similarly, the rear casters 110*b* may be positioned to avoid collision with each other when the galley cart 100*b* transitions to the fully deployed configuration.

In some embodiments, the auxiliary caster releases 302 may include hand-operable or foot-operable mechanisms, e.g., T-handles inserted into a slot mid-way down the side panels of the left-side compartments 102, 102*a* and right-side compartments 104 to deploy the auxiliary casters 212. For example, the T-handles may be locked in place when the auxiliary casters 212 are deployed, and stowing the auxiliary casters would involve unlocking and lifting the T-handles, raising the auxiliary casters and support arms 304 into a detent position. In some embodiments, the auxiliary casters 212 may be rotatably or pivotably deployed (and restowed) via the lever 122 shown by FIG. 1.

Referring in particular to FIG. 3D, when the galley cart 100*b* is in the fully deployed configuration (e.g., deployed for meal service along a passenger aisle), the doors 106, 108 of the left-side and right-side compartments 102*a*, 104 may be folded back against the sides of the galley cart (e.g., in an open position) and secured thereto by magnetic catches 314.

In embodiments, a support arm 304*a* of the auxiliary caster 212*a* (mounted to the deploying left-side compartment 102) may include, or terminate in, an angled pivoting plate 316 coupled to the auxiliary caster release 302. For example, when the galley cart 100*b* is returned (318) from the fully deployed configuration to the default configuration, the pivoting plate 316 may raise (318*a*) the support arm 304*a* and associated auxiliary caster 212*a* clear of the cabin floor to facilitate the rotation (318*b*) of the left-side compartment 102 back into the default orientation (e.g., as shown by FIG. 1). In some embodiments, only one set of auxiliary casters 212*a* may include a support arm 304*a* including or terminating in the pivoting plate 316 (e.g., the auxiliary casters 212*a* coupled to the left-side compartment 102, but not the auxiliary casters 212 coupled to the right-side compartment 104) to prevent unbalancing of the galley cart 100*b*. In some embodiments, restoring of the auxiliary casters 212*a* may be possible only when the galley cart 100*c* is partially retracted from the deployed configuration, e.g., as shown by FIG. 3B.

Referring in particular to FIG. 3E, the galley cart 100*c* may be implemented and may function similarly to the galley cart 100*b* of FIGS. 3A through 3D, except that the auxiliary casters 212*b* of the galley cart 100*c* may be unidirectional casters fixed to the support arms 304 (e.g., via yokes 320). In some embodiments, due to the narrow interior compartments of the galley cart 100*c*, multi-section stacked meal compartments 322 may be used with the galley cart 100*c* (e.g., as opposed to full-width food trays (322*a*) associated with conventional half-size galley carts).

Figure 4B:
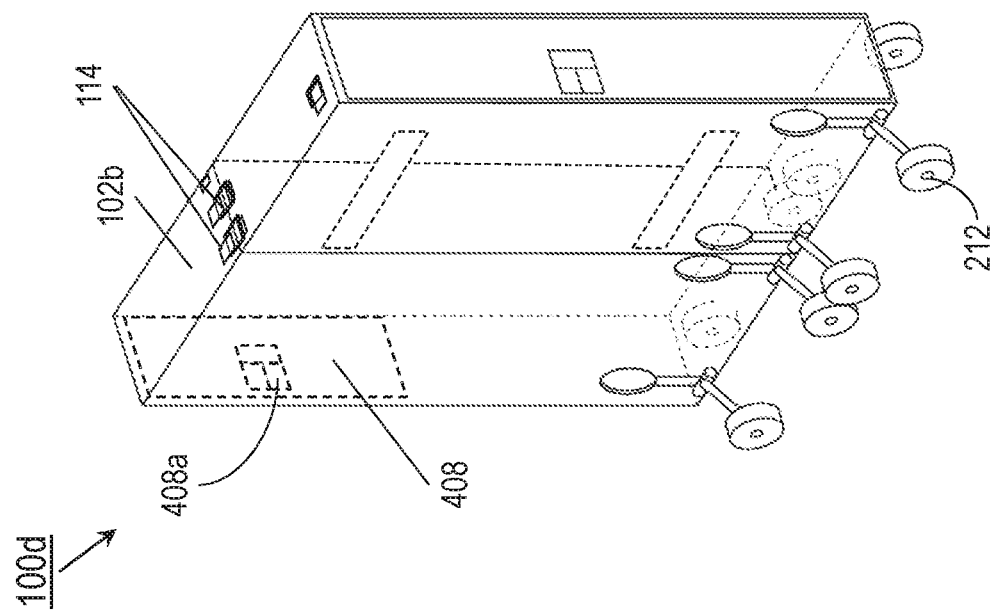
FIG. 4B is an isometric view illustrating the aircraft galley cart of FIG. 4A in the fully deployed configuration.
Figure 4A:
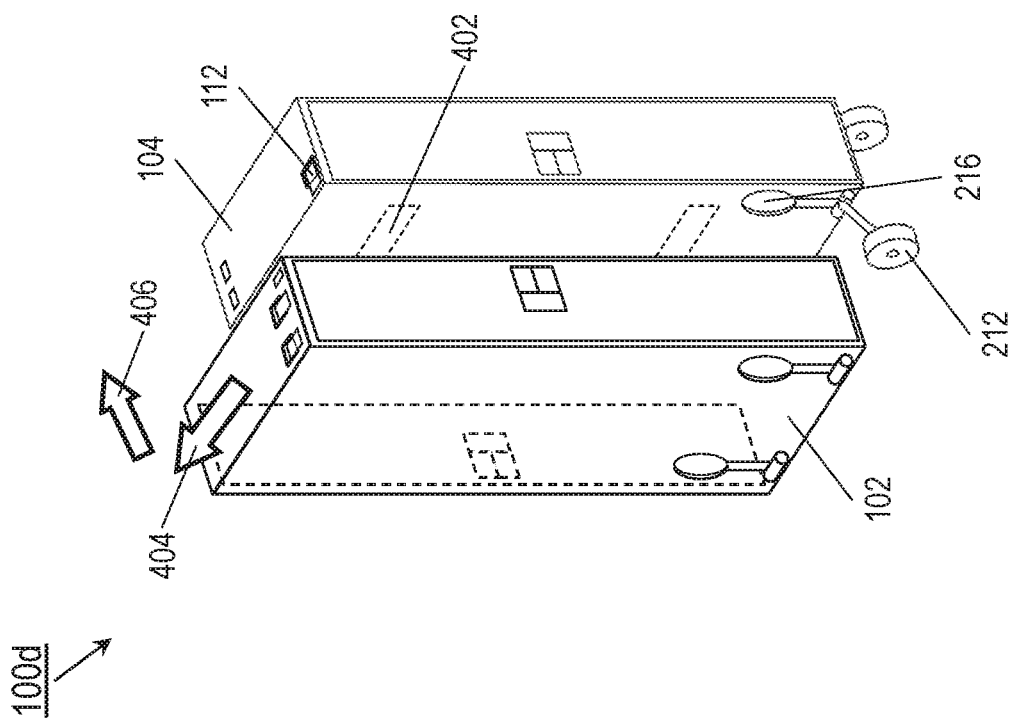
FIG. 4A is an isometric view illustrating the aircraft galley cart of FIG. 1 in a partially deployed configuration between the default configuration and the deployed configuration.

Referring to FIGS. 4A and 4B, the galley cart 100*d* may be implemented and may function similarly to the galley carts 100, 100*a-c* of FIGS. 1 through 3E, except that the galley cart 100*c* may slidably, rather than pivotably, transition into the narrow configuration (shown in particular by FIG. 4B, and similar to the galley cart 100*a* shown by FIG. 2B).

In embodiments, the left-side and right-side compartments 102, 104 may be connected (e.g., via the shared common lateral surface 208) via rails 402 or any other appropriate sliding mechanism. For example, when the locking devices 112 securing the galley cart 100*d* in the default configuration are disconnected or released, the left-side compartment 102 may slide rearward (404; e.g., laterally along the rails 402) and pivot (406) into an alternative orientation 102*b* such that the galley cart is in the fully deployed configuration particularly shown by FIG. 4B. The rails 402 may further include, e.g., lateral sliders, articulating pivots, or other like means of allowing the left-side compartment 102 to slide 404 and pivot 406 into the alternative orientation 102b. The galley cart 100b may include additional locking devices 114 for securing the left-side and right-side compartments 102b, 104 of the galley cart in the deployed configuration. The auxiliary casters 212 may similarly deploy to balance the galley cart 100b in the narrow configuration and allow the cart to traverse the aisle normally. In some embodiments, the galley cart 100d may be able to transition between the default and deployed configurations while within the aircraft aisle, as additional width may not be required (compare the galley cart 100a, FIGS. 2A and 2B).

In some embodiments, when the left-side compartment 102 slides into the alternative orientation 102b, the left-side compartment 102 may no longer be accessible via the door 106 (e.g., which may be obstructed by the right-side compartment 104). In some embodiments, the left-side compartment 102 may include an auxiliary door 408 opposite the door 106. For example, when the galley cart 100d is secured in the deployed configuration (as shown by FIG. 4B), the left-side compartment (102a) may be accessible via the auxiliary door 408 having handle 408a. In some embodiments, either or both of the door 106 and the auxiliary door 408 may be partial-sized (e.g., half-sized, quarter-sized) relative to the door 108 of the right-side compartment 104, with separate and distinct interior compartments accessible respectively through each door.

Referring to FIG. 5A, the locking device 500 may be implemented and may function similarly to the locking devices 112, 114 of FIGS. 1 through 3D, except that the locking device 500 may include a hook 502, catch 504, handle 506, and bolt hole 508.

In embodiments, the hook 502 (e.g., attached to a left-side compartment 102) may be capable of locking into the catch 504 (e.g., attached to a right-side compartment 104 via a base 510) to secure the left-side and right-side compartments in either a default configuration (as shown by, e.g., FIG. 1) or a deployed configuration (as shown by, e.g., FIG. 3D). For example, the hook 502 may be of adjustable length (e.g., adjustable relative to the base 510 via a threaded end 502a); pivoting (506a) the handle 506 may attach or release the hook 502 relative to the catch 504. In some embodiments, the handle 506 (and thus the hook 502) may be lockable in a desired position via the bolt hole 508 (e.g., by securing a bolt 508a therethrough).

Referring to FIG. 5B, the locking device 500a may be implemented and may function similarly to the locking device 500 of FIG. 5A, except that the locking device 500a may be a fixed-detent hook-on-catch (e.g., non-adjustable) whereby the hook 502 may be attached to or release from the catch 504 via the handle 506.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An aircraft galley cart, comprising:
a first portion hingedly coupled to a second portion, the first portion accessible via at least one first door and the second portion accessible via at least one second door;
the aircraft galley cart having a default configuration associated with a first cart width and a deployed configuration associated with a second cart width less than the first cart width, the first portion adjacent to the second portion relative to a first shared plane when in the default configuration and relative to a second shared plane when in the deployed configuration, the first portion hingedly articulable relative to the second portion to transition the aircraft galley cart between the default configuration and the deployed configuration;
a plurality of main casters attached to an underside of the first portion or the second portion, the aircraft galley cart capable of travel along an aircraft floor via the plurality of main casters;
and
a plurality of auxiliary casters dorsally attached to the first portion or the second portion, the plurality of auxiliary casters configured to stabilize the aircraft galley cart when in the deployed configuration,
wherein each of the plurality of auxiliary casters is rotatably coupled to the first portion or the second portion by a support arm, the support arm pivotably coupled to the first portion or the second portion.

2. The aircraft galley cart of claim 1, wherein:
the first portion is operatively coupled to the second portion by at least one continuous hinge corresponding to a vertical axis;
and
the first portion is rotatable relative to the continuous hinge to transition the aircraft galley cart between the default and deployed configurations.

3. The aircraft galley cart of claim 1, further comprising one or more of:
a first locking device configured to secure the aircraft galley cart in the default configuration;
or
a second locking device configured to secure the aircraft galley cart in the deployed configuration.

4. The aircraft galley cart of claim 1, wherein each of the plurality of auxiliary casters is capable of 360 degrees of rotation relative to the support arm.

5. The aircraft galley cart of claim 1, further comprising:
at least one auxiliary caster release operable by a user of the aircraft galley cart, the auxiliary caster release configured for at least one of:
retaining the plurality of auxiliary casters in a stowed position when the aircraft galley cart is in the default configuration;
or
deploying the plurality of auxiliary casters from the stowed position to a deployed position.

6. The aircraft galley cart of claim 5, wherein:
the at least one auxiliary caster release includes a pivot plate coupled to the support arm, the pivot plate configured to raise at least one of the support arm or the associated auxiliary caster when the aircraft galley cart is returned from the deployed configuration to the default configuration.

7. The aircraft galley cart of claim 5, wherein the plurality of auxiliary casters are lockable in the deployed position.

8. The aircraft galley cart of claim 1, wherein the aircraft galley cart is configured for stowage within a cart bay of an aircraft galley when in the default configuration.

9. An aircraft galley cart, comprising:
a first portion slidably coupled to a second portion, the first portion accessible via at least one first door and the second portion accessible via at least one second door;
the aircraft galley cart having a default configuration associated with a first cart width and a deployed configuration associated with a second cart width less than the first cart width, the first portion adjacent to the second portion relative to a first shared plane when in the default configuration and relative to a second shared plane when in the deployed configuration, the first portion slidably articulable relative to the second portion to transition the aircraft galley cart between the default configuration and the deployed configuration;
a plurality of main casters dorsally attached to the first portion or the second portion, the aircraft galley cart capable of travel along an aircraft floor via the plurality of main casters;
and
a plurality of auxiliary casters attached to one of the first portion or the second portion, the plurality of auxiliary casters configured to deploy when the aircraft galley cart is in the deployed configuration,
wherein each of the plurality of auxiliary casters is rotatably coupled to the first portion or the second portion by a support arm, the support arm pivotably coupled to the first portion or the second portion; and
wherein each of the plurality of auxiliary casters is capable of 360 degrees of rotation relative to the support arm.

10. The aircraft galley of claim 9, wherein the first portion is accessible via at least one third door when the aircraft galley cart is in the deployed configuration.

11. The aircraft galley cart of claim 9, further comprising at least one of:
a first locking device configured to secure the aircraft galley cart in the default configuration;
or
a second locking device configured to secure the aircraft galley cart in the deployed configuration.

12. The aircraft galley cart of claim 9, further comprising:
at least one auxiliary caster release operable by a user of the aircraft galley cart, the auxiliary caster release configured for at least one of:
retaining the plurality of auxiliary casters in a stowed position when the aircraft galley cart is in the default configuration;
or
deploying the plurality of auxiliary casters from the stowed position to a deployed position.

13. The aircraft galley cart of claim 9, wherein the aircraft galley cart is configured for stowage within a cart bay of an aircraft galley when in the default configuration.

* * * * *